(12) United States Patent
Carlin

(10) Patent No.: US 8,930,844 B2
(45) Date of Patent: Jan. 6, 2015

(54) NETWORK REPOSITORY OF DIGITALIZED 3D OBJECT MODELS, AND NETWORKED GENERATION OF PHOTOREALISTIC IMAGES BASED UPON THESE MODELS

(76) Inventor: Bruce Carlin, San Diego, CA (US)

( * ) Notice: Subject to any disclaimer, the term of this patent is extended or adjusted under 35 U.S.C. 154(b) by 16 days.

(21) Appl. No.: 12/384,233

(22) Filed: Apr. 1, 2009

(65) Prior Publication Data

US 2014/0125649 A1   May 8, 2014

Related U.S. Application Data

(63) Continuation-in-part of application No. 10/081,841, filed on Feb. 20, 2002, now Pat. No. 7,523,411, which is a continuation-in-part of application No. 09/643,507, filed on Aug. 22, 2000, now Pat. No. 7,062,722.

(51) Int. Cl.
| | |
|---|---|
| G06F 3/048 | (2013.01) |
| G06Q 30/02 | (2012.01) |
| G06T 19/00 | (2011.01) |
| H04L 29/06 | (2006.01) |
| H04L 29/08 | (2006.01) |
| G06F 17/30 | (2006.01) |
| G06F 3/00 | (2006.01) |

(52) U.S. Cl.
CPC ............... *G06Q 30/02* (2013.01); *G06T 19/00* (2013.01); *H04L 29/06* (2013.01); *H04L 67/10* (2013.01); *G06F 17/30061* (2013.01); *G06F 2217/04* (2013.01)
USPC ........... 715/782; 715/794; 715/783; 715/848; 715/849

(58) Field of Classification Search
USPC .................... 715/282, 764, 782, 783; 705/27; 345/419, 582
See application file for complete search history.

(56) References Cited

U.S. PATENT DOCUMENTS

| | | | | | |
|---|---|---|---|---|---|
| 5,255,352 | A | * | 10/1993 | Falk ............................... | 345/582 |
| 5,688,125 | A | * | 11/1997 | Birdsong-Raffo .............. | 434/72 |
| 5,793,372 | A | * | 8/1998 | Binns et al. .................... | 345/419 |
| 5,847,971 | A | * | 12/1998 | Ladner et al. ..................... | 703/1 |
| 5,896,139 | A | * | 4/1999 | Strauss .......................... | 345/440 |
| 5,898,438 | A | * | 4/1999 | Stewart et al. ................. | 345/419 |
| 5,977,978 | A | * | 11/1999 | Carey et al. ................... | 345/419 |
| 5,982,378 | A | * | 11/1999 | Kato ............................. | 345/582 |
| 5,982,399 | A | * | 11/1999 | Scully et al. ................... | 345/522 |
| 5,986,667 | A | * | 11/1999 | Jevans ........................... | 345/619 |
| 6,002,853 | A | * | 12/1999 | de Hond ........................ | 709/219 |
| 6,005,969 | A | * | 12/1999 | Thomas et al. ................ | 382/162 |
| 6,014,142 | A | * | 1/2000 | LaHood ......................... | 715/848 |
| 6,014,503 | A | * | 1/2000 | Nagata et al. ..................... | 703/1 |
| 6,052,669 | A | * | 4/2000 | Smith et al. .................. | 705/26.5 |

(Continued)

*Primary Examiner* — Steven B Theriault
(74) *Attorney, Agent, or Firm* — Fuess & Davinenas

(57) ABSTRACT

In a network-linked computer graphics image rendering system serving to render images of objects in scenes, these objects are so rendered from high-resolution 3D models and textures that are, in particular, stored and maintained on one or more server computers in one or more libraries that are secure. Using stand-in object models and textures, design professionals at client computers are able to "fine-tune" and preview designs that incorporate objects stored securely in the server's(s') models' library(ies). Yet the high-resolution, 3D, relatively expensive, and proprietary object models remain completely secure at one (i.e., centralized) or more (i.e., distributed) server computers. 2D perspective-view or stereo in-situ photorealistic images of scenes incorporating these objects are rendered at the one or more sever computers, for subsequent remote viewing at the one or more client computers.

10 Claims, 3 Drawing Sheets

(56) References Cited

U.S. PATENT DOCUMENTS

| | | | |
|---|---|---|---|
| 6,154,222 A * | 11/2000 | Haratsch et al. | 345/473 |
| 6,201,546 B1 * | 3/2001 | Bodor et al. | 345/620 |
| 6,226,004 B1 * | 5/2001 | Nishihara | 345/420 |
| 6,281,903 B1 * | 8/2001 | Martin et al. | 345/421 |
| 6,307,567 B1 * | 10/2001 | Cohen-Or | 345/619 |
| 6,331,858 B2 * | 12/2001 | Fisher | 345/582 |
| 6,377,257 B1 * | 4/2002 | Borrel et al. | 345/419 |
| 6,384,821 B1 * | 5/2002 | Borrel et al. | 345/421 |
| 6,389,322 B1 * | 5/2002 | Park et al. | 700/98 |
| 6,414,679 B1 * | 7/2002 | Miodonski et al. | 345/420 |
| 6,456,287 B1 * | 9/2002 | Kamen et al. | 345/427 |
| 6,524,107 B1 * | 2/2003 | Brown | 434/72 |
| 6,525,731 B1 * | 2/2003 | Suits et al. | 345/427 |
| 6,536,043 B1 * | 3/2003 | Guedalia | 725/90 |
| 6,556,207 B1 * | 4/2003 | Julien | 345/473 |
| 6,593,925 B1 * | 7/2003 | Hakura et al. | 345/426 |
| 6,600,502 B1 * | 7/2003 | Brewster, Jr. | 715/854 |
| 6,611,267 B2 * | 8/2003 | Migdal et al. | 345/428 |
| 6,690,369 B1 * | 2/2004 | Smith et al. | 345/419 |
| 6,727,925 B1 * | 4/2004 | Bourdelais | 715/852 |
| 6,912,293 B1 * | 6/2005 | Korobkin | 382/100 |
| 6,925,196 B2 * | 8/2005 | Kass et al. | 382/111 |
| 7,148,899 B2 * | 12/2006 | Dumesny et al. | 345/582 |
| 7,149,333 B2 * | 12/2006 | Pieper et al. | 382/128 |
| 7,149,665 B2 * | 12/2006 | Feld et al. | 703/2 |
| 7,193,633 B1 * | 3/2007 | Reinhardt et al. | 345/629 |
| 7,203,628 B1 * | 4/2007 | St. Ville | 703/1 |
| 2002/0002574 A1 * | 1/2002 | Jennings, III | 708/520 |
| 2002/0007276 A1 * | 1/2002 | Rosenblatt et al. | 704/260 |
| 2002/0010655 A1 * | 1/2002 | Kjallstrom | 705/27 |
| 2002/0030679 A1 * | 3/2002 | McDowall et al. | 345/421 |
| 2002/0032697 A1 * | 3/2002 | French et al. | 707/500.1 |
| 2002/0069295 A1 * | 6/2002 | Edwards et al. | 709/246 |
| 2002/0089501 A1 * | 7/2002 | Tampieri | 345/426 |
| 2002/0094125 A1 * | 7/2002 | Guo | 382/199 |
| 2002/0112025 A1 * | 8/2002 | Johansson et al. | 709/217 |
| 2003/0051255 A1 * | 3/2003 | Bulman et al. | 725/135 |
| 2004/0250083 A1 * | 12/2004 | Schwab | 713/182 |
| 2005/0038636 A1 * | 2/2005 | Wakelam et al. | 703/1 |
| 2005/0081161 A1 * | 4/2005 | MacInnes et al. | 715/765 |

* cited by examiner

NETWORK REPOSITORY OF DIGITALIZED 3D OBJECT MODELS, AND NETWORKED GENERATION OF PHOTOREALISTIC IMAGES BASED UPON THESE MODELS

REFERENCE TO RELATED APPLICATIONS

The present patent application is related as a continuation-in-part to U.S. patent application Ser. No. 10/081,841 filed on Feb. 20, 2002, to the selfsame inventor of the present application, and having the title "NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF OBJECT PROMOTION AND PROCUREMENT, AND GENERATION OF OBJECT ADVERTISEMENTS", issued Apr. 29, 2009, as U.S. Pat. No. 7,523,411.

That application, and patent, is itself a continuation-in-part of U.S. patent application Ser. No. 09/643,507 filed on Aug. 22, 2000, to inventors including the inventor of the present application, and having the title NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF PROMOTION AND PROCUREMENT, issued Jun. 13, 2006, as U.S. Pat. No. 7,062,722.

The contents of both related predecessor patent applications are incorporated herein by reference.

BACKGROUND OF THE INVENTION

1. Field of the Invention

The present invention generally concerns a client-server computer system, and a process, (1) for managing and maintaining, at one or more severs upon a worldwide computer communications network, a central or a distributed secure repository of digitalized three-dimensional ["3D"] models of 3D objects, and colors, textures, etc., related to these models and objects, and (2) for using client's(s') request(s) upon the network at the one or more servers these 3D models and related colors, textures, etc., for the generation of photorealistic perspective view and/or 3D images, and (3) for supplying the colored and/or textured image(s) so generated upon and across the same communications network to the requesting client(s), all the while prohibiting direct access to the 3D models and related colors, textures, etc. by the client(s).

In particular, the modeled 3D objects may be either real or virtual, and are most typically 3D objects shown for promotion as located in, surrounding, or in front of, either real or virtual 3D scenes. The photorealistic images generated of most typically non-fanciful objects and scenes that could be existing within the real world. These object and scene images are useful for (1) promoting or selling the depicted objects directly to a consumer, and/or (2) generating promotional images of the objects and/or (3) facilitating collaborative design.

The present invention further generally concerns a method of doing business upon a worldwide computer communications network by (1) managing and maintaining a secure central or distributed repository of high-resolution digital models and/or related colors, textures, etc. of objects and of scenes, and (2) providing of photorealistic image generation services based in part upon these models and related colors, textures, etc.

In particular, the (1) digitally modeled objects may be items such as architectural products, furniture and furnishings that are prospectively shown appropriately colored and textured as located within modeled scenes of a prospective purchaser's real property or equipment. In this eventuality, the (2) photorealistic image generation may be valuable to a prospective seller of architectural products, furniture and/or furnishings in making a sale of the photorealistically shown objects to the prospective purchaser.

2. Background 2.1 General Background of the Invention

The present invention will be seen to have both (i) business and (ii) technical aspects.

Technically, the present invention will be seen to broadly concern a secure digital model repository for use in, and with, the software-based system of the predecessor applications and patents for both (i) interactively producing, and (ii) rendering, across a digital communications network, photo-realistic composite images of interactively customized products in such surroundings as are customary to and specified by the viewer of the image, different viewers desiring and appreciating different surroundings.

Business-wise, the present invention will be seen to broadly concern a central role of this repository in profiting from the (1) management and maintenance of 3D digital models, and/or (2) a photorealistic image rendering system utilized for the purposes of promoting and selling such products, without requiring the distribution of proprietary high resolution 3D object models and/or related textures.

2.2 Previous Patents Directed to Image Generation in Interior or Exterior Design U.S. Pat. No. 4,318,121 to Taite, et. al., for INTERIOR DECOR COMPOSITION AND DISPLAY SYSTEMS concerns display systems are of particular utility in assisting interior decorators and homemakers in selecting appropriate color and fabric combinations. In particular, the subject display systems provide a luminous image of an interior decor including components, such as furniture, drapes and carpets. The system picks up colors from different samples, each of which typically has an area smaller than the area of any displayed component. These picked-up colors are selectively filled in the displayed components when the image is displayed. Color arrangements are changed by substituting other picked-up colors in the display of particular components.

U.S. Pat. No. 4,931,929 to Sherman for DESIGN COMPONENT SELECTION COMPUTER WITH SPECIFICATION OF PRODUCT CHARACTERISTICS AND OF COLOR BY MACHINE READABLE DEVICE concerns a process for identification, description and display of design components, such as interior decoration products, selected by describing desired component characteristics to a digital computer. An image database is provided, preferably in the form of an addressable optical videodisk, each frame of which portrays an individual design component, and the images are displayed by operation of a computer-controlled archive system such as a random-access optical videodisk player. A characteristics database is provided to characterize each portrayed design component by a variety of product categories including at least color, price, manufacturer and image database address. The process obtains one or more desired component characteristics, examines the characteristics database to identify design components meeting the desired product characteristics, and displays the identified component images together with a complete record of characteristics for each product. The desired color characteristic can be obtained by selection from a text dictionary of color identification terms, by machine inspection of a machine-readable color comparison sample, or by optical spectrum analysis of a pre-existing product sample.

U.S. Pat. No. 5,255,352 to Falk for MAPPING OF TWO-DIMENSIONAL SURFACE DETAIL ON THREE-DIMENSIONAL SURFACES concerns a system and method for providing surface detail to mathematically-defined three-dimensional surfaces which preserves the specific dimensional integrity of the surface detail image being mapped in order to provide dimensionally correct surface detail. This is accomplished by performing the intermediate step of mapping the surface detail image to a two-dimensional flattened pattern piece representation of the surface and thereafter mapping this representation to the three-dimensional surface. The system and method of the present invention may be used as one function of a greater three-dimensional computer aided design system for any industry which utilizes flat sheets of material formed or assembled into a finished product, including textiles, apparel, footwear, upholstered furnishings, automotive or interior design.

U.S. Pat. No. 5,601,431 to Howard for an INTERIOR DESIGN SYSTEM AND METHOD concerns an interior design system comprising a display assembly having three flexible transparent overlays, a plain background sheet hinged to corresponding edges of the overlays, and a template sheet hinged to a free edge of the background sheet and having "scale" background and foreground grid sections. All this is for assisting in laying out interior room decorator's designs with a comprehensive catalog of design elements printed with scale designs of perspective furniture and accessory designs, and architectural elements for creating the room space to be decorated. The catalog pages have rows of printed scale designs covered with transparent plastic, with overlying, selectively removable and replaceable design elements. The design elements have designs that are printed to the same scale on carrier sheets of flexible "static-cling" material. These carrier sheets are rectangular sections that are cut from a printed sheet the same size and shape as the backing sheet. In this manner, the catalog pages provide marked storage positions for the design elements after use.

In addition, the backing sheets are marked with descriptive labels and special coded symbols in distinctive shapes and colors for assisting in selection and coordination of interior designs, and also are imprinted with generic labels for the designs. The method constitutes the steps of (i) providing the catalog of scale images and the background and foreground grid sections, (ii) labeling and coding the images for identification, coordination and storage, (iii) selecting candidate images from the catalog and transferring them to the grid sections, (iv) applying the images in the desired positions and combinations, thereby to create a decorator's design, plus, optionally, (v) applying colors as an overlay on the completed design for a more complete rendering.

U.S. Pat. No. 5,940,806 to Danial for a METHOD AND APPARATUS FOR RECEIVING, STORING AND PROVIDING DATA CORRESPONDING TO GEOMETRICALLY DESCRIBABLE RAW MATERIALS concerns an apparatus and method employing a programmable computer for providing a list of data items corresponding to geometrically describable materials based upon a profile specified by a user. The list of data items is stored in a data base. Each data item includes geometrically descriptive terms and trading parameters identifying characteristics of an item offered for sale by an advertiser. A profile is generated by a user which includes geometrically descriptive terms and trading parameters identifying characteristics of an item sought for purchase by the user. The profile identified by the user is compared to each data item stored in the data base and data items are identified which match the profile. The data item identified are provided to the user in accordance with the user's specific delivery instructions.

U.S. Pat. No. 6,005,969 to Thomas, et. al., concerns METHODS AND SYSTEMS FOR MANIPULATION OF IMAGES OF FLOOR COVERINGS OR OTHER FABRICS that enable a highly streamlined and efficient fabric or textile sampling and design process. The sampling and design process is claimed to be particularly valuable in the design and selection of floor coverings, wall coverings and other interior design treatments. A digital library of fabric models is created, preferably including digitized full-color images associated with digital representations of positions that are located within, and which characterize, the models. Via an application implemented according to conventional software methods and running on conventional hardware having high resolution graphics-processing capabilities, a user may navigate among the set of alternative models, and may modify the positions of the selected models to test out desired combinations of characteristics—such as poms or yarn ends, or models of floor coverings—and view the results in high resolution. A method is provided for substituting colors in digital images of photographic quality, while preserving their realism particularly in the vicinity of shadows. The resulting samples or designs can be stored and transmitted over a telecommunications network or by other means to a central facility that can either generate photographic-quality images of the samples, or can directly generate actual samples of the carpet or other material of interest.

2.3 A Specific Previous Interior Design System Operative on a Private Satellite Down-Link, Phone Line Up-Link Communications Network The system and method of the present invention will be seen to involve interactive communications across a digital communications network for the purpose of producing images that typically include furniture. At least one previous upholstered furniture customization system involves a real-time network-based interactive system for support of visualizing upholstered furniture prior to placing an order for the upholstered furniture.

This existing interactive system of La-Z-Boy™ Incorporated, and possibly others, is available for use by sales associates in La-A-Boy™ furniture showrooms. The system permits prospective customers to preview La-Z-Boy furniture upholstered in La-Z-Boy offered fabrics. It requires a La-Z-Boy furniture item number, and a La-Z-Boy fabric number. The system then maps the fabric onto a static perspective view of the selected furniture item.

To the extent of depicting furniture, this previous system is similar to the system and method of the present invention. However, the system used by La-Z-Boy is considerably different from the system of the present invention as to each of, inter alia, (i) system interaction (rote versus sophisticated) with the targeted user (a furniture salesman versus an interior designer), (ii) how the furniture images are generated and presented (2D versus 3D, and fixedly versus being shown in context), (iii) the technical capabilities of the image generation (no provision for scaling, rotation and placement of upholstered furniture images into background scenes), and (iv) the business model supported (retail store furniture promotion vs. a professional-level interior design tool supporting furniture selection, placement and procurement as well as promotion.)

2.4 A Specific Interior Design System Operative on the Internet

The system and method of the present invention will be seen to involve communications across a digital communications network, to wit: the Internet. At least one interactive design system—evolved as a real-time network-based evolution of an older PC-based software program product—already (circa 2000) exists on the Internet. This existing system is superficially similar to the system and method of the present invention. However, the existing system is again considerably different from the system of the present invention as to each of, inter alia, (i) the targeted audience (amateurs versus professionals), (ii) how the images are generated and presented (2D versus 3D), and (iii) the business model supported (furniture and software promotion vs. professional-level design assistance, furniture promotion and procurement.)

The existing interactive system is the called the cMyVision Free Internet design software for use in interior, exterior, home and landscape improvement. The cMyVision software is a product, and cMyVision web site a service, of Visual Applications, Inc. (VisApp), headquartered in Kansas City, Mo. (cMyVision is a trademark of VisApp.) VisApp is a publisher of personal visualization technology, with a web site as of the year 2000.

In use of the cMyVision™ free Internet design software for interior, exterior, home and landscape improvement, a digital photo of a house, normally the client's own house, is initially required. Into this 2D scene a 2D object is inserted from the cMyVision library, or database. The system of the present invention will be seen to differ in that, from two or more 2D views, a 3D model of the client's 3D space, replete with dimensions, is first constructed. Then this 3D space is populated with 3D objects such as furniture. Accordingly, the cMyvision system operates to produce two-dimensional (2D) images while the system of the present invention, employing full three-dimensional (3D) models of both scenes and objects, produces full perspective scene views.

VisApp also sells a product called VisualPhile Personal Visualization Software, touted to support professional interior remodeling and design.

VisualPhile is personal computer software with the same features as cMyvision. It runs on a personal computer without an Internet connection, as its library is included with the program. It is primarily suited to providing photo-realistic visualizations of home remodeling as opposed to decorating projects. As in cMyVision, a certain degree of photo-realism stems from the use of photographs for both rooms and built-ins, appliances and furnishings.

However, there exist inherent limitations—arguably severe when applied to professional interior design—in both cMyVision sand VisualPhile and their use of digital photographs. These previous systems (i) are not based upon 3D coordinates (as will be seen to be used in the present invention), so furniture images have to be placed and scaled visually by the user; and (ii) the furniture objects are 2D images, so they cannot be rotated to match the angle of the room photograph (as will seen to be the case in the present invention). Therefore, in both cMyVision and VisualPhile, room photos must be taken from a specified perspective, as their furniture photographs are all taken from this angle. Moreover, (iii) because the furniture images are only photographs, and not 3D models, it is not possible to map fabrics on them. This last limitation cannot be mitigated and is highly significant in professional interior design applications.

2.5 Stand Alone Personal Computer Interior Design Programs

A number of software programs are commercially available which support interior design. These programs generally run on personal computers and allow the user to design rooms, place furniture objects into rooms, change wall colors and furniture fabrics, and display the customized furniture in the decorated rooms. Custom Home 3-D Design and Decor, published by Sierra On-line, Inc., 5 in 1 Home Design by Punch! Software LLC, and 3D Home Interiors by Broderbund all support most of these design-assistance and visualization objectives. In addition, numerous commercially-available programs support architectural rendering, including computer-aided design (CAD) programs like AutoCAD, which incorporate 3-D functionality and therefore have application to interior design.

Custom Home 3-D Design and Decor includes a program called Photo Home Interiors. This program, unlike the others, allows users to import photographs of actual rooms into the program, and then place furniture objects into the room images. The objects include 3-D furniture models, which can be rotated and scaled to fit the scene. However, the room images are not associated with a 3-D model of the room. In other words, while Photo Home Interiors does allow furniture objects to be shown as an overlay on top of room photographs, it lacks the capability of rendering furniture objects placed onto floor plans in photographically-derived scenes. Therefore, this program does not allow wall and floor coverings to be displayed in the proper perspective. In addition, the 3-D objects need to be visually scaled by the user to compensate for the perceived distance from the camera position. With this system, it is not possible to evaluate furniture objects of specific dimensions as to scale. For all of these reasons, is cumbersome to use on a personal computer, and would be even more so over a digital communications network.

Furthermore, the furniture objects are generic and therefore not available for purchase, no procurement features are available, the furniture and fabric database is very limited in quantity and quality. Finally, this program does not operate over a digital network.

As a result of such limitations, even this program has limited professional application. These limitations in the prior art are overcome in the present invention, which incorporates proprietary technology developed to support this highly desirable functionality.

2.6 Existing 3D Image Capture Technology

The present invention will be seen to beneficially employ in the generation of three-dimensional (3D) images of a human head a 3D image capture technology. Such a technology is commercially available, circa 2000, from Minolta Co., Ltd. in combination with MetaCreations, Inc., in the 3D 1500 camera product. The 3D 1500 is a complete hardware/software package that combines a quality Minolta digital camera with MetaCreation's MetaFlash 3D image production technology. It allows creation of high-quality 3D models in MetaCreation's MetaStream file format, which can be transmitted quickly over the network for further manipulation.

Another example of a three-dimensional (3D) image acquisition system for deriving 3D models of the human head is the ShapeSnatcher 3D-Toolkit from Eyetronics, Inc. After calibration, data can be captured within the time needed for a single photograph or frame. The 3D model is textured, with a perfect alignment between the shape and the texture. Skin color, marks or scars are visible as they would be on a photograph.

2.7 Relationship to the Predecessor Patent Applications

The present patent application is a continuation-in-part to U.S. patent application Ser. No. 10/081,841 filed on Feb. 20, 2002, which application itself is a continuation-in-part of U.S. patent application Ser. No. 09/643,507 filed on Aug. 22, 2000. The present application is related to these applications as being the substantial equivalent thereof, amplifying what is arguably only but a somewhat narrow point. Namely, the present invention and application particularly concerns the utilization of the previously-referenced network-linked rendering system to remotely render objects that are, in particular stored in a library that is secure. Using stand-in objects, as discussed in patent application Ser. No. 10/081,841, design professionals at client computers are able to "fine-tune" and present designs that incorporate objects stored securely in the library. The objects remain completely secure at one (i.e., centralized) or more (i.e., distributed) server computers, yet 2D perspective-view in-situ photorealistic renderings incorporating these objects can be both generated at the one or more sever computers, and subsequently remotely viewed at the one or more client computers.

This would allow, for example, an architect working at a sever computer to render a bathroom interior with a specific Kohler sink faucet, after Kohler had placed a high-resolution 3-D model of this faucet in the secure library(ies) of the one or more server computers. Clearly the security of this 3-D model, which is likely both expensive and proprietary, is maintained. This is useful to prevent unauthorized reverse engineering (copying) of the faucet from the 3-D model by a competitor.

The second predecessor application contains a variant teaching that, as applied to the secure library invention of the present application discussed above, permits a server-based rendering using very large (high-resolution) models and textures while permitting all such models and related information—like true textures and colors—to remain secure on the server. It would be very time-consuming and expensive (in a bandwidth sense) to download 50 MB of models for rendering on the client. Furthermore such downloads would compromise the security of the models, as they could then be stolen.

Given that relatively inexpensive high-performance computers are now readily available and in use by business, it is the security and data transmission speed issues that are the real competitive advantage of server-based rendering in accordance with the present invention in business applications. Also, keeping the large models and textures (and colors, etc.) on the server allows for relatively easy maintenance of the database. If the high-resolution models were distributed, updating them to current versions would become very difficult and expensive. The system of the present invention that combines client rendering of small stand-in models and textures to support scene specification and image preview, with server-based rendering of proprietary high-resolution models and textures is the best of both worlds.

SUMMARY OF THE INVENTION

The present invention has aspects both as (1) a system, and a process, for the secure management of 3D object models and related textures of various resolutions in and for the generation of images at various resolutions upon a worldwide computer communications network, and upon client and server computers having different software and graphics image processing capabilities connected by this network, and as (2) a method of doing business involving a secure repository of digital 3D objects and related textures, wherein the objects and textures are inaccessible and secure, yet the user can render images that incorporate them in scenes of the user's own specification or choosing, upon a worldwide computer communications network.

1. A system, and a process, for use of 3D object models and textures in and for the remote generation of photorealistic images upon a worldwide digital communications network.

In its system and process aspects, the present invention contemplates a central or distributed secure repository database, connected upon a worldwide communications network, for (1) storing three-dimensional computer models and textures of architectural, engineering and interior decoration objects and design components, and for (2) providing remote rendering services, across the worldwide communications network, such that users of the repository database may remotely render photorealistic images of objects represented by the 3D models in the repository as are placed, positioned, textured, oriented and illuminated within one or more scenes that are, most typically, real-world scenes of a user's specification or choosing.

In accordance with this application and related predecessor applications, a user—most typically an architect, interior designer, engineer, furnishing or auto salesperson or the like—that is normally using a relatively-lower-capability network-connected client computer—selects normally from one or more object catalogs (as are normally located at a remote and relatively more powerful server computer) one or more objects and related textures. Each object is normally associated with one or more model pairs: both (1) a derived or companion low-resolution 3D object model, and also (2) a high-resolution, 3D, object model. There can be many textures choices for each object, also typically stored as both higher- and lower-resolution pairs.

The user may transfer to his own, client, computer the low-resolution stand-in model and texture, but not the companion high-resolution model and high-resolution texture, which remain securely located on the remote server computer. The stand-in model and texture can be included in a 3D scene developed by the user on his own, client, computer, so that the scene can be developed, edited, preview rendered at the client computer, albeit with only low resolution repository database objects and textures.

Then, if the user wishes to render the scene incorporating the high-resolution companion model(s) and textures located in the repository, the user may upload his or her scene file to the server computer for remote rendering. During the image rendering process, software residing on the server computer (s) replaces the stand-in model(s) and texture(s) with its (their) high-resolution companion models and textures, such that the remotely rendered image depicts the subject objects at high resolution. The high-resolution models and textures remain securely located on the server computer, yet can be utilized by a remote user to render scenes described and previewed by the remote user that incorporate the high-resolution models and textures on the server.

Accordingly, the user at the client computer interacts with the derived or companion low-resolution 3D object models and textures, and also with a 3D scene that is itself most typically developed by the user, in order to typically produce a first, rudimentary, low-resolution perspective view image of the selected 3D object(s) sized, positioned, oriented and illuminated in the selected scene. This much (with the exception of using stand-in models and textures) is typical of the functionality of computer remote image rendering programs circa 2009, and before.

However, subsequent progress to the rendering and viewing of a photorealistic image is, in accordance with the present and related patent applications, different than heretofore. Namely, a server computer securely storing high resolution 3D object models and textures is used for remote rendering of a photorealistic image, and then this photorealistic image is returned to the client computer for viewing.

One reason for this partition of functionality is, as is taught in the related predecessor patent applications, to more quickly and efficiently perform the computationally more demanding image rendering tasks upon the relatively more capable, and more expensive, server computers of a networked client-server computer system. But, as concerns the present invention, an even more important reason is that the high-resolution 3D object and texture models—which are often proprietary and built at considerable cost—may be kept confidential and secure on the server computer(s). These models may thus not be readily illicitly expropriated for various uses, including in the creation of unauthorized copies of the real objects that they represent.

It is useful to focus attention as to exactly but not exclusively where the system and method of the present and related inventions are believed to be most usefully differentiated from the prior art. In the first place, study of the related predecessor applications (the contents of which are incorporated herein by reference) will show that those inventions, as well as the present invention, are much involved with where (as well as how, and when) photorealistic images are produced. In accordance with those inventions, photorealistic images of selectable objects, including of saleable real-world objects—objects like furniture and furnishings, plants and architectural objects, and cars—as are located in selected scenes—including in the real-world buildings, rooms or driveways of a potential object purchaser ultimately viewing the photorealistic images—are produced in part at the client computer, and in part at a server computer, each part being produced where it is most propitious to do so. In brief, the images are first assembled in rudimentary form by persons interacting with conventional graphics programs running on client computers that are typically of but modest capabilities, and, communication on the network transpiring, are only later rendered photorealistically by typically powerful and therefore relatively fast server computers running sophisticated and powerful graphics image generation software; the server-generated photorealistic image being sent back across the network to the client computer for viewing by a system user.

Clearly this bifurcation of tasks can provide efficiencies in computer hardware and software and the maintenance of the same. However, another advantage of this method and system of photorealistic image generation is that chain store retailers, such as those of furniture, furnishings and autos, previously were effectively limited to selling only from expensive, typically inconveniently located, and limited-inventory, "big box" stores. These same retailers may now sell from vast, customized inventories of digitalized real and virtual goods by displaying photorealistic images rendered to prospective customers reasonably fast in typically small stores as may be conveniently located, for example, in high traffic shopping malls. Coupled with the continuing acceleration to customized consumer products in the industrialized world, the ability to display successive rounds of goods customized to what the customer thinks that he or she wants in a context of a real environment (i.e., in a room, or the exterior of a building, or in a landscape) in which the sold product may become used, can actually produce superior customer satisfaction then simply having the prospective customer choose objects from paper catalogs after the viewing of analogous goods. Additionally, small stores with computers are much cheaper than "big box" stores for the retailer to lease/own and to operate, and better located.

In contemplating that a network-based photorealistic image generation system and method should have a central repository (or, at least, access point for a distributed repository) to potentially-diverse, normally-high-resolution, digital object models and textures from which (in part) photorealistic images can be (in part) generated, the immediate present invention realizes at least two things.

First, the high-resolution 3D models and textures are nearly always proprietary to the manufacturer of the goods modeled, being costly to produce and sensitive and confidential lest they become used in the wrong hands to produce unauthorized reverse-engineered copies. In the present invention these high-resolution 3D models and textures are stored within a secure server, only, and are neither released to client computers, nor can they be effectively reverse engineered even from rendered photorealistic images. (Eight object image views in opposing directions along each of three orthogonal axes are normally never called for, and may be defeated by the simple expedient of blocking any image rendering from certain angles.)

Second, high-resolution 3D models and textures of products from diverse manufacturers may be safely co-located, or at least securely channeled to and through, an honest broker located at but a single place on a communications network. The business of the honest broker is to allow on-demand generation of photorealistic images of scenes incorporating objects and items, or groups of objects and items, in, most normally, support of the sale of these items and objects from various manufacturers. To do so the honest broker is interested in accumulating, and in holding confidential, as many high resolution 3D objects, textures and possibly scene models as possible, prospectively from multiple different producer sources. In this way, for example, art can be viewed in the context of furnishings each of which may came from a different manufacturer/producer source.

2. A method of doing business in rendering-photorealistic images incorporating securely-stored 3D models upon a worldwide computer communications network.

In its aspects as a method of doing business, the present invention again contemplates upon a worldwide computer communications network (1) a central repository of high-resolution digital models of objects and related textures, and (2) the providing of photorealistic image generation services based in part upon these models and textures. Particularly when the modeled objects are of items such as architectural products, plants, furniture and furnishings, and/or cars prospectively shown located within modeled scenes of a prospective purchaser's real property, the (2) photorealistic image generation may be valuable to a prospective seller of such products in making a sale of the shown objects to the prospective purchaser. Note that the objects appearing within the generated photorealistic image need not exist (1) at the seller thereof, (2) nor anyplace, and, indeed (3) may be virtual, and never really existing anywhere. In case of the sale of (3) virtual objects, the objects are normally custom fabricated after the sale.

Further, a large, professionally-managed and maintained, database of high-resolution 3D models from which quality photorealistic images are timely remotely rendered, including by the proprietary system and methods of this and related inventions and patents, may become a natural monopoly. That is, any person or company looking for a photorealistic image rendering of anything may, in time, go to what could reasonably become the world's dominant repository of the proprietary information, in the form of high-resolution 3D models and textures, from which said image might be generated.

Completion of the business model requires charging some one or more parties for the image rendering services performed. At the onset those parties requiring photorealistic images would normally be expected to pay equitably and fairly for image generation. Later, however, should the network repository and image generation service become an effective monopoly, parties such as furniture manufactures placing 3D models and/or textures in the database might pay a recurring or non-recurring fee upon entrance of each model into the database, and further recurring fees each time the model is used in generation and delivery of an image.

Therefore, in one of its aspects the present invention is embodied in (1) a network repository of digitalized 3D object models, and (2) networked generation of photorealistic perspective view and/or 3D images based upon these models.

Namely, and specifically, the present invention is embodied in a method using digital 3D models and/or textures in and for the remote rendering of photorealistic images upon a computer network. The method includes storing in one or more server computers upon a computer network a collection of three-dimensional digital models and associated textures of items which models and textures are sufficiently detailed so as to permit photorealistic images of these items to be rendered.

The method optionally continues with requesting at a client computer from the one or more server computers, and receiving, a relatively low resolution and therefore non-proprietary stand-in scene model, and using this model to develop a 3D scene that includes the item; and further formulating at this client computer upon the computer network a 3D scene file which contains (1) identities, and (2) any of sizes, locations, spatial orientations, colorations, patterns, textures and illuminations, of one or more items in the scene.

In and by these steps performed the client computer does not have access to digital models of the identified items of resolution sufficient to render a photorealistic image of reasonable size thereof even should it attempt to do so.

The method continues with sending the 3D scene file so formulated at the client computer from the client computer to the one or more server computers upon the computer network; receiving the formulated information at the one or more server computers, and using this information to first identify one or more corresponding high resolution three-dimensional models and any of associated high-resolution patterns and colorations and textures, and to then using the one or more identified three-dimensional models and any associated patterns and colorations and textures along with the other scene file information to render a photorealistic image of the identified or more items located, spatially oriented, colored, patterned, textured and illuminated in the scene. Thus formulation and preview of the scene transpires at the client computer, but photorealistic rendering of the scene using one or more high resolution three-dimension models and any associated textures, that reside solely on one or more servers, permits the remote photorealistic image rendering to transpire exclusively, and only, at the one or more server computers.

The method preferably further includes, after the photorealistic rendering, a sending of the rendered photorealistic image upon the network to the client computer for viewing thereat.

In the method the storing in the one or more server computers upon the computer network may also be of colors or textures or both colors and textures as are associated with the items of the collection of three-dimensional digital models. In this case the photorealistic rendering at the one or more server computers is using this color, or this texture, or both this color and texture information to render the photorealistic image of the item in the scene.

In the method the client computer may have a model or models of any one or more items identified sufficient to render a non-photorealistic image of reasonable size of the one or more items in the scene. Then in the method, and before the sending step, the method further includes rendering a non-photorealistic image of reasonable size of the scene at the client computer; and displaying the rendered non-photorealistic image to a human so that this human may interactively with the client computer choose the identities, and any of sizes, locations, spatial orientations, colorations, textures and illuminations of one or more items in the scene so as to preview and edit the scene. By these steps the human interacts quite normally with the client computer for the selection of one or more items to be shown at any of selected size(s), location(s), spatial orientation(s), coloration(s), texture(s) and illumination(s) as part of a formulated scene; but the photorealistic image of the formulated scene must be, and is, rendered at, and only at, the one or more server computers.

Further in the most preferred method the one or more items, and the corresponding three-dimensional digital models and textures, are items of, and subject to depiction in scenes of, any of architectural, interior, furnishing and automotive or industrial designs.

The digital models and/or textures at the one or more server computers are preferably secure, and cannot be obtained by an unauthorized client computer.

At least some of the secure three-dimensional digital models and/or textures at the one or more server computers are proprietary.

In yet another of its aspects the present invention is embodied in a method of doing business in 3D model and texture use and/or maintenance, and in rendering(s) of images from the 3D models, upon a worldwide computer communications network.

In a most preferred method of doing business in photorealistic renderings, incorporating digital 3D models of items to generate photorealistic images of these items within scenes, the method conducted upon a computer communications network, the method commences with maintaining a secure repository of proprietary high-resolution digital models and/or textures of objects at one or more server computers upon a computer communications network.

Then transpires a receiving at the one or more server computers a request from a client computer upon the computer communications network to render a a scene file incorporating digital models to be any one or ones of selectively sized, located, spatial oriented, colored, textured and illuminated in a selected scene.

Responsively to this received request, the one or more server computers render a photorealistic image of the selected one or more items, using the proprietary models and/or textures that reside on the one or more server computers, as may be selectively sized, located, spatially oriented, colored, textured and illuminated in the selected scene.

Finally transpires a transmitting upon the computer communications network the rendered photorealistic image to the requesting client computer.

In this process a party controlling the sever computer or computers can charge manufacturers of items for which high-resolution digital models and/or textures are maintained on the server for the purpose of allowing rendering of images showing the items without allowing direct access to the proprietary models and/or textures themselves, and can also charge a party(ies) controlling the requesting client computer for the images rendered and the transmitting and/or the printing of the photorealistic image(s), or can charge both the manufacturers and the party(ies).

In this business method a party controlling the server computer or computers is able to observe who is performing renderings using which models and/or textures and is therefore is able to sell such information.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

1. Technical Aspects of the Present Invention, which Employs Computer Graphics

To facilitate an understanding of the present invention, it is described hereinafter with reference to a particular example of a network-linked repository of 3D objects. It will be appreciated, however, that this particular example is not the only practical embodiment of the invention. Rather, the invention is applicable to any type of digital 3D object repository that may support remote rendering of objects located on a centralized or distributed repository of 3D objects.

The present invention is practically directed to features of a remote rendering system that operate in conjunction with the remote secure repository of 3D objects. While the specific hardware components of the computer system do not form part of the invention itself, they are briefly described herein to provide an overview of the environment in which the principles of the invention are implemented.

Figure 1:
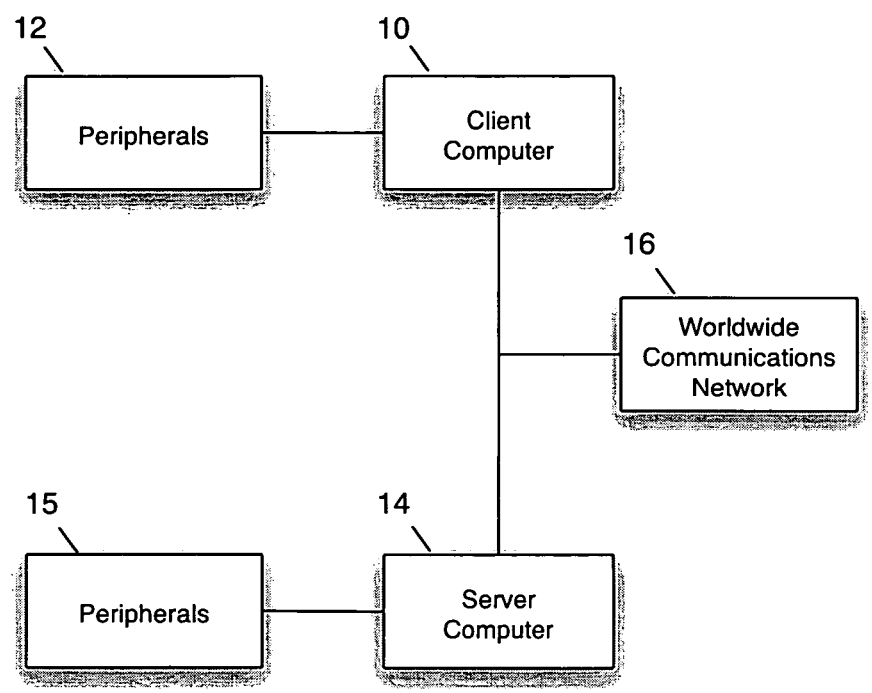
FIG. 1 is a block diagram of the elements of a preferred embodiment of a system having a network accessible repository of digitalized 3D object models and textures, and on which system networked generation of photorealistic images based upon these models and textures is performed, in accordance with the present invention.

Referring to FIG. 1, an exemplary computer system includes a client computer 10 having a variety of external peripheral devices 12 connected thereto, and also a server computer 14 having a variety of external peripheral devices 15 connected thereto. Both the client computer 10 and the server computer 14 are attached to a worldwide communications network 16.

The client computer 10 software is capable of creating, editing and preview-rendering a 3D scene file that can be transmitted across the worldwide communications network 16 to the server computer 14. The client computer 10 is also capable of downloading from the server computer 14 relatively low-resolution stand-in models and textures of objects that will be depicted in the scene. The server computer 14 can receive and render the scene file transmitted from the client computer 10, and return a perspective view and/or 3D (stereo) image rendered on the server computer 14 utilizing the image file transmitted from the client computer 10. The rendering software on the server computer 14 is also capable of substituting high-resolution models and textures, residing in a secure repository on or connected to the server computer 14, for the stand-in models and textures, at render time. The rendered image files are returned to the client computer 10 for viewing on the client computer 10.

Figure 2A:
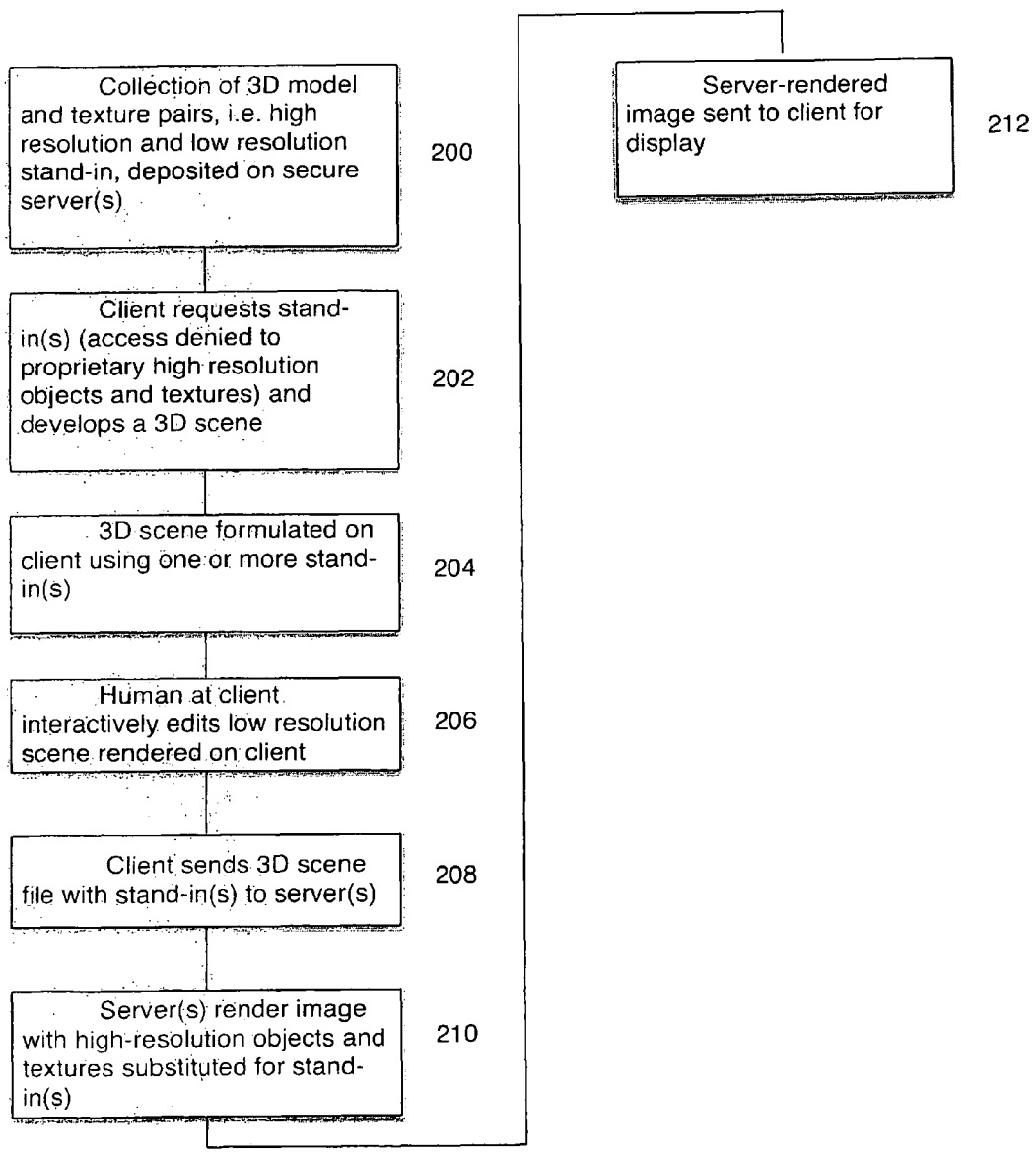
FIG. 2, consisting of FIGS. 2a and 2b, is a functional flow chart of the networked generation of photorealistic images based upon repository models and textures as is performed by the system of the present invention previously seen in FIG. 1.

FIG. 2a is a flow chart showing one preferred process of the present invention.

A collection of proprietary 3D model and texture pairs is established on one or more secure server computers 14 (shown in FIG. 1). These pairs consist of both high-resolution objects and textures and low-resolution non-photorealistic 3D objects and textures, at 200.

A client computer 10 (shown in FIG. 1) requests one or more stand-in 3D objects and/or associated textures for use on the client 10 (shown in FIG. 1) computer. Stand-ins are requested, as the high-resolution objects and textures are secured and not, available to the client computer 10 (shown in FIG. 1), at 202.

A 3D scene is formulated on the client computer 10 (shown in FIG. 1) using one or more stand-in objects and stand-in associated textures. Other objects and textures, not received from one or more server computers 14 (shown in FIG. 1) may, also be part of the scene, at 204.

A human at the client computer 10 (shown in FIG. 1) reviews the non-photorealistic scene and interactively makes changes to it, changing for example, lighting, object positions and sizes, textures, etc., until the scene is of his or her liking, at 206. Now the scene is ready for being photo-realistically rendered at one or more server computers 14 (shown in FIG. 1).

The client computer 10 (shown in FIG. 1) sends the scene file or file information, incorporating one or more stand-ins, to one or more server computers 14 (shown in FIG. 1), at 208.

The server(s) computers 14 (shown in FIG. 1) render the scene, substituting high-resolution objects and textures for the stand-ins at render-time, at 210. The server(s) 14 (shown in FIG. 1) then send the completed high-quality rendering to the client computer 10 (shown in FIG. 1) for display, at 212.

Thus the high-quality rendering has been realized across a computer network.

The client computer has never had, not used, proprietary, or confidential, objects and textures, at 202.

Conversely, the server computer does have, and use, high-resolution objects and textures, at 210, so as to ultimately render, and send to the client, the high-quality rendering at 212.

The proprietary objects and textures have been maintained confidential throughout the entire rendering process.

Figure 2B:
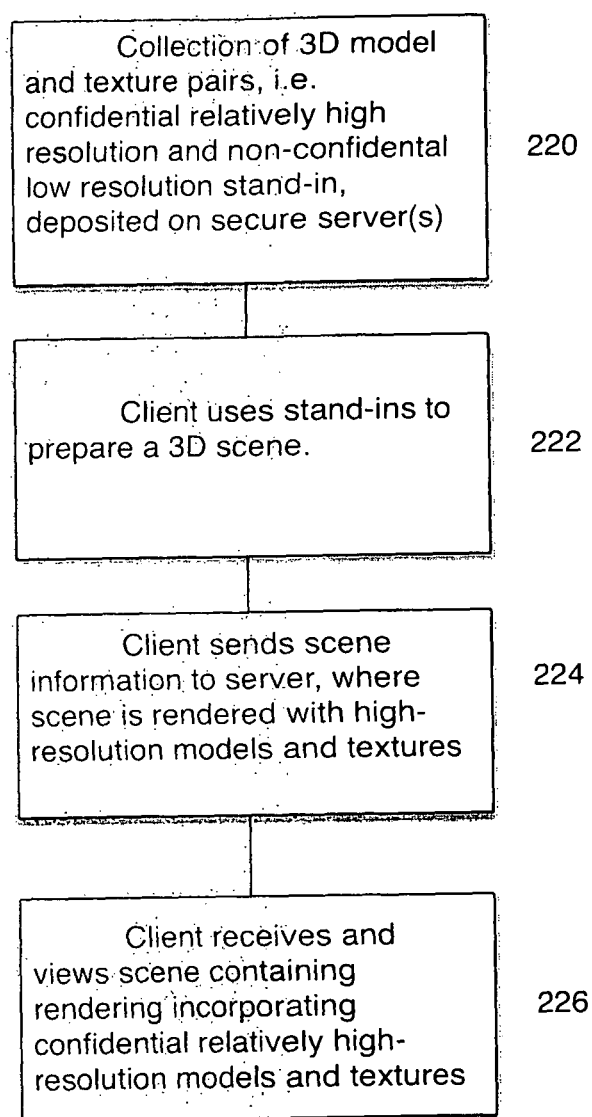

A simplified flow chart showing the same preferred process of the present invention that was the subject of FIG. 2a is shown in FIG. 2b.

A "[c]ollection of 3D model and texture pairs, i.e. confidential relatively high resolution and non-confidential low resolution stand-in, deposited on secure server(s)" is within block 220. A "[c]lient uses stand-ins to prepare a 3D scene" in block 222. A "[c]lient sends scene information to server, where scene is rendered with high resolution models and textures" in block 224. Finally, a "[c]lient receives and views scene containing rendering incorporating confidential relatively high resolution models and textures" in block 226.

As before in FIG. 2a, the high-quality rendering has been realized across a computer network.

However, and also as before, the client computer has never had, nor used, proprietary, or confidential, objects and textures, at 222.

2. Discussion of the Process and the Results

In accordance with the present and related inventions, a design professional such as an architect, interior designer, furniture sales associate or advertising designer running a program at a client computer (i) uses the world wide web to connect to a graphics server computer, and (ii) interactively selects and downloads stand-in furnishings or other objects and associated textures from this server computer. These are then included in a scene file developed on the client computer.

The user then previews the scene and interactively edits the scene until it is to the user's liking. The user then directs the client computer to communicate with the server, so as to (iii) transmit the scene file to the server for rendering in a specified manner. The server computer then renders the scene, substituting high-resolution models and textures for one or more of the objects included in the scene file. The resulting image is then transmitted from the server computer to the client computer where it is received and can be displayed.

The present and related predecessor inventions involve "state-of-the-art" computer graphics circa 2009, but are not strictly about computer graphics. Instead, the present and related predecessor inventions teach to, and how to, partition upon a communications network such functionality as realizes the still-considerable challenge of rapidly generating and displaying a good-sized print resolution truly photorealistic perspective view or stereo custom image to a viewer and/or image designer/creator—for example a custom image of architectural products selected from a vast catalog, and placed, oriented, colored and/or textured and illuminated in a custom scene. Photorealistic images generally require not just high-resolution models and textures, but also may realistic lighting, shadows, reflections, transparency and other elements that are computationally intensive.

The server-based rendering of the present invention permits the use of very large (high-resolution) models and textures, and allows such models to remain secure on the server. It would be very time-consuming and expensive (in a bandwidth sense) to download 50 MB of models for rendering on the client. Furthermore such downloads would compromise the security of the models, as they could then be stolen. Given that relatively inexpensive high-performance computers are now readily available and in use by business, it is the security, portability, rendering speed and data transmission speed issues that are the real competitive advantage of server-based rendering in business applications. For example, a hand-held computing device connected to the worldwide communications network via a cellular link, could specify and initiate a large and computationally-intensive photorealistic remote rendering utilizing large proprietary models and textures. Also, keeping the large models and textures on the server allows for relatively easy maintenance of the model and texture database. If the high-resolution models were distributed, updating them to current versions would become relatively difficult and expensive. The system of the present invention that combines client computer preview of relatively low resolution local renderings of small stand-in models and textures with server-based relatively high-resolution renderings of proprietary high-resolution models and textures and incorporating more computationally-intensive but more accurate lighting and rendering techniques is the best of both worlds.

Accordingly, just as Gutenberg can be said with the invention of the printing press to have made every man his own printer, and Carlson can with his invention of xerography to have made every man his own publisher, the present invention endeavors to make every man—at least as is in accordance with the present and related inventions connected on the Internet to a specialized graphics image rendering service—his own designer, permitting the individual to relatively quickly render such photorealistic scenes as are essentially limited only by his or her imagination and the specified or available models and textures.

3. Business Aspects of the Present Invention

The business method of the present and predecessor inventions is based on a client-server computer graphics system for both (i) specifying a 3D scene on a local client computer, so as to ultimately (ii) render at a server computer a perspective view or stereo image of the scene for display on the client computer or for printing—which images are normally and strongly preferably photorealistic.

All (i) the image specification and (ii) the image rendering transpires across a communications network—typically a worldwide digital communications network (the Internet)—is most typically for purposes of advertising, promoting, selling or aiding in approval, selection or specification of the depicted objects in situ, although the information interchange of the present invention can also be used to create art, games, multimedia presentations and the like.

The objects for which the images are generated are preferably not only products for sale, but products that are strongly beneficially best shown and appreciated in a context strongly relevant to an individual viewer, such as, by way of example, a window systems for a commercial building or furnishings for a person's own present or prospective home. The person using this system or his or her client is not only induced to buy or approve an object by seeing it (photorealistically) in-situ, but may sometimes also be induced to order complementary objects, such as furnishings or additional furniture pieces color-coordinated with a selected piece. The seller, for example a furniture manufacturer, need neither make nor stock the item being interactively rendered photorealistically for sale, for example a sofa, and need only coordinate to have any purchases "drop shipped" from the actual source. Finally, onerous and costly returns are minimized because the purchaser can "see" how the ordered objects (such as furniture and furnishings) will actually look in situ before they are even purchased. Such in-context visualization is very helpful in aiding design decisions and in stimulating purchase decisions of visually attractive products.

The object/product selection and image rendering service is normally furnished for use upon a digital communications network, and preferably on the Internet, for authorized (licensed) users of the system, of the present invention, which users are generally allowed only indirect access to detailed, high-resolution digital models and related textures and maps of the objects that will be photorealistically rendered and depicted. The high resolution of the models is typically evidenced by a very large number of polygons, particularly when the objects have complex geometric shapes. This allows photorealistic images to be rendered, even when the camera is positioned very close to the object, that is zoomed-in. Services of the system of the present invention may be offered (i) though retail outlets of the depicted goods, or (ii) to design professionals (whether for fee for use, or merely to promote selection, specification and sale of the goods), and/or (iii) for fee to those parties who may wish to use the models and textures, and the digital image rendering services, but who will not themselves be furnishing revenues, such as by purchasing selected depicted items. The services may be in particular furnished to design professionals (i) so as to help them satisfy the desire of their customers to make informed and confident product selection and purchase decisions, (ii) so as to promote specific merchandise by showing it in an environment with which the prospective customer is both familiar and sympathetic, and (iii) as a design aid.

The network provider of these services can profit (i) from being the provider/manufacturer of the depicted products, or (ii) from merely being in the chain of commerce on such products, acting in any remunerative capacity from product advertiser to manufacturer to wholesaler to retailer, and/or (iii) from being a mere service provider or licensor. Note that, much like a modern supermarket, an imaging service provider serving as a middleman (choice (ii) of the preceding sentence) prospectively profits from both ends of the sales and distribution chain: (i) manufacturers and/or suppliers of goods pay in money, or in favorable prices for their goods, in order to have these goods interactively promoted, while (ii) the end purchasers of the goods may also use the brokering and order placement services of the imaging service provider. The system of the present invention benefits everyone from designer to consumer to manufacturer, rendering as unnecessary trips to major product manufacturing and design centers merely to see new offerings. With increased customization, and minimal inventories, many product offerings will exist only as virtual images at the time(s) of sale, and will be efficiently manufactured as and when sold.

Note that the object/product selection, scene specification and image rendering processes are preferably conducted interactively by persons such as store salesman and design professionals having familiarity with the user software interface, and not exclusively by the end item product consumers. This is because the sophisticated products that are most advantageously promoted by being photorealistically shown in situ are generally the opposite of commodities, and are typically customized, configured (like windows) and/or expensive. The products are typically, and preferably, of a nature such that consumer discrimination and taste are involved in product selection—which is exactly why the products are most successfully photorealistically shown in perspective view in an environment with which the consumer is familiar, and to which the consumer is receptive. Moreover, the purchaser may expect, and may reasonably receive, "turn-key" help and assistance in making his/her/their selections, and the present system provides for this after the designer or sales associate is trained in the use of the system.

The operator of a repository of high resolution 3D object models of manufactured goods and related textures can offer the design community convenient access to a large collection of such objects and textures for use as design aids and for use in custom renderings. Products from competing manufacturers are therefore accessible for comparative studies and to aide interactive design development. The high-resolution models and textures used in the photorealistic rendering can be kept secure and proprietary, even though designers will be able to utilize them in renderings.

In accordance with these and other possible variations and adaptations of the present invention, the scope of the invention should be determined in accordance only with the following claims, and not solely in accordance with that embodiment within which the invention has been taught.

What is claimed is:

1. A method using digital 3D models and/or textures in and for the remote rendering of photorealistic images upon a computer network, the method comprising:
   storing in one or more server computers upon a computer network a confidential collection of three-dimensional digital models of items which models permit photorealistic images of these items to be rendered;
   requesting at a client computer from the one or more server computers, and receiving, a relatively low resolution and non-confidential stand-in scene model, and using this model to develop a 3D scene that includes the item; and further
   formulating at this client computer upon the computer network a 3D scene file which contains (1) identities, and (2) any of sizes, locations, spatial orientations, colorations, patterns, textures and illuminations, of one or more items in the scene;
   wherein the client computer does not, have access to the confidential digital models of the identified items of resolution sufficient to render a photorealistic image thereof;
   sending the 3D scene file so formulated at the client computer from the client computer to the one or more server computers upon the computer network;
   receiving the formulated information at the one or more server computers, and using this information to first identify one or more corresponding confidential high resolution three-dimensional models and any of associated high-resolution patterns and colorations and textures, and to then using the one or more identified three-dimensional models and any associated patterns and colorations and textures along with the other scene file information to render a photorealistic image of the identified or more items located, spatially oriented, colored, patterned, textured and illuminated in the scene;
   wherein formulation and preview of the scene transpires at the client computer, but photorealistic rendering of the scene using, one or more confidential high resolution three-dimension models that reside solely on one or more remote servers, permits the remote photorealistic image rendering using the confidential models to transpire exclusively, and only, at the one or more server computers.

2. The method according to claim 1 that, after the photorealistic rendering, further comprises:
   sending the rendered photorealistic image upon the network to the client computer for viewing thereat.

3. The method according to claim 1
   wherein the storing in the one or more server computers upon the computer network is also of colors or textures or both colors and textures as are associated with the items of the collection of three-dimensional digital models; and
   wherein the photorealistically rendering at the one or more server computers is using this color, or this texture, or both this color and texture information to render the photorealistic image of the item in the scene.

4. The method according to claim 1 that, after the receiving the scene file at the server, and using it to render the photorealistic image step, further comprises the steps of:
   sending upon the computer network the photorealistic image rendered at the one or more server computers to a client computer; and
   receiving and displaying at the client computer the photorealistic image sent from the one or more server computers upon the computer network.

5. The method according to claim 1
   wherein the client computer has a model or models of any one or more items identified sufficient to render a non-photorealistic image of the one or more items in the scene;
and wherein, before the sending step, the method further comprises:
   rendering a non-photorealistic image of the one or more items in the scene at the client computer; and
   displaying the rendered non-photorealistic image to a human so that this human may interactively with the client computer choose the identities, and any of sizes, locations, spatial orientations, colorations, textures and illuminations of one or more items in the scene so as to preview and edit the scene;
   wherein the human interacts with the client computer for the selection of one or more items to be shown at any of selected size(s), location(s), spatial orientation(s), coloration(s), texture(s) and illumination(s) within a formulated scene; but wherein the photorealistic image of the selected one or more items in the formulated scene must be, and is, rendered at, and only at, the one or more server computers.

6. The method according to claim 1 wherein the one or more items, and the corresponding three-dimensional digital models, are items of, and subject to depiction in scenes of, any of architectural, interior, furnishing and automotive or industrial designs.

7. The method according to claim 1 wherein the three-dimensional digital models and/or textures at the one or more server computers are confidential and secure, and cannot be obtained by an unauthorized client computer.

8. The method according to claim 7 wherein at least some of the secure three-dimensional digital models and/or textures at the one or more server computers are both confidential and proprietary.

9. A method for the remote rendering of photorealistic images upon a computer network, the method comprising:

storing in one or more server computers upon a computer network (1) a confidential collection of relatively-high-resolution three-dimensional digital models of items, and (2) non-confidential relatively-low-resolution digital models of the same items;

requesting at a client computer from the one or more server computers, and receiving, one of the relatively low-resolution non-confidential item model, and using this relatively low-resolution non-confidential item model to develop a 3D digital model of a scene in which the item might suitably appear;

sending from the client computer the 3D digital scene model so formulated to the one or more server computers upon the computer network;

receiving the formulated digital scene model at the one or more server computers, and using both this scene model and the confidential relatively-high-resolution three-dimensional item model corresponding to the non-confidential relatively-low-resolution item model sent to and used by the client computer, to render a photorealistic image of the item in the scene;

wherein formulation and preview of the item in the scene transpires at the client computer, but photorealistic rendering of the item in the scene using a confidential relatively-high-resolution three-dimension item model that resides solely on one or more servers, transpires exclusively at the one or more server computer.

10. A method for the rendering upon a computer network a photorealistic image of an item in a scene from both confidential and non-confidential digital models of the item, the method comprising:

storing in a server computer upon a computer network a relatively-high-resolution three-dimensional digital model of an item, and (2) a non-confidential relatively-low-resolution digital model of the same items;

requesting at a client computer, also upon the computer network, from the server computers the relatively low-resolution non-confidential item model, receiving this requested model, and using this received develop a 3D digital model of a scene in which the item might suitably appear;

sending from the client computer the 3D digital scene model so formulated to the server computer upon the computer network;

receiving at the sever computer the formulated and sent digital scene model, and using both this scene model and a confidential relatively-high-resolution three-dimensional item model corresponding to the non-confidential relatively-low-resolution item model sent to and used by the client computer, to render a photorealistic image of the item in the scene;

wherein formulation and preview of the item in the scene transpires at the client computer using a non-confidential relatively-low-resolution three-dimension item model, but photorealistic rendering of the item in the scene using a confidential relatively-high-resolution three-dimension item model that resides solely on the server computer, transpires exclusively at and on the server computer.

* * * * *